US006887611B2

(12) United States Patent
Cramer et al.

(10) Patent No.: US 6,887,611 B2
(45) Date of Patent: May 3, 2005

(54) FLEXIBLE FUEL CELL GAS MANIFOLD SYSTEM

(76) Inventors: Michael Cramer, 15 Fordyce Heights, New Milford, CT (US) 06776; Jagdish Shah, 14 Reservoir Dr., Wallingford, CT (US) 06492; Richard P. Hayes, 46-232 Kahuhipa St., Apt. C105, Kaneohe, HI (US) 96744; Dana A. Kelley, 57 Crossbrook Rd., New Milford, CT (US) 06776

( * ) Notice: Subject to any disclaimer, the term of this patent is extended or adjusted under 35 U.S.C. 154(b) by 0 days.

(21) Appl. No.: 10/264,866

(22) Filed: Oct. 4, 2002

(65) Prior Publication Data

US 2003/0124409 A1 Jul. 3, 2003

Related U.S. Application Data

(63) Continuation-in-part of application No. 09/636,452, filed on Aug. 11, 2000, now Pat. No. 6,461,756.

(51) Int. Cl.[7] ............................. H01M 8/04; B32B 3/30
(52) U.S. Cl. ......................... 429/38; 429/37; 165/158; 138/26; 428/167

(58) Field of Search ............................. 429/37, 38, 39; 165/158; 138/26; 220/23.8, 557; 428/167, 121

(56) References Cited

U.S. PATENT DOCUMENTS

| 4,670,361 A | * | 6/1987 | Tsutsumi et al. | 429/34 |
| 6,461,756 B1 | * | 10/2002 | Blanchet et al. | 429/37 |
| 6,531,237 B2 | * | 3/2003 | Kelley et al. | 429/35 |

* cited by examiner

Primary Examiner—John S. Maples
(74) Attorney, Agent, or Firm—Cowan, Liebowitz & Latman, P.C.

(57) ABSTRACT

A fuel cell stack manifold system in which a flexible manifold body includes a pan having a central area, sidewall extending outward from the periphery of the central area, and at least one compound fold comprising a central area fold connecting adjacent portions of the central area and extending between opposite sides of the central area, and a sidewall fold connecting adjacent portions of the sidewall. The manifold system further includes a rail assembly for attachment to the manifold body and adapted to receive pins by which dielectric insulators are joined to the manifold assembly.

41 Claims, 10 Drawing Sheets

FLEXIBLE FUEL CELL GAS MANIFOLD SYSTEM

CROSS REFERENCE TO RELATED APPLICATIONS

This application is a continuation-in-part of patent application Ser. No. 09/636,452, filed on Aug. 11, 2000 now U.S. Pat. No. 6,461,756.

STATEMENT REGARDING FEDERALLY SPONSORED RESEARCH OR DEVELOPMENT

This invention was made with Government support under Contract No. PDI 6533 awarded by the U.S. Department of Energy. The Government has certain rights in the invention.

BACKGROUND OF THE INVENTION

This invention relates to fuel cell stacks having external manifolds and, in particular, to an external manifold system for use in coupling gases to or from the face of a fuel cell stack.

A fuel cell is a device which transforms chemical energy in the form of fuel (e.g., natural gas, bio-gas, methanol, diesel fuel, etc.) directly into electrical energy by way of an electrochemical reaction. Like a battery, a fuel cell contains two electrodes, an anode and a cathode. Unlike a battery the fuel cell will produce electrical power as long as fuel and oxidant are delivered to the anode and cathode, respectively. The major advantage of fuel cells over more traditional power generation technologies (e.g., IC engine generators, gas or steam turbines, etc.) is that the fuel cell converts chemical to electrical energy without combusting the fuel. The efficiency of the fuel cell is, therefore, not thermodynamically limited, as are heat engines, by the Carnot cycle. This allows fuel cell based systems to operate at a far higher efficiency than traditional power plants thereby reducing fuel usage and byproduct emissions. Additionally, due to the controlled nature and relatively low temperature of the chemical reactions in a fuel cell, the system produces nearly zero pollutant emissions of hydrocarbons, carbon monoxide, nitrogen oxides and sulfur oxides.

Fuel cells are typically arranged in stacked relationship. A fuel cell stack includes many individual cells and may be categorized as an internally manifolded stack or an externally manifolded stack. In an internally manifolded stack, gas passages for delivering fuel and oxidant are built into the fuel cell plates themselves. In an externally manifolded stack, the fuel cell plates are left open on their ends and gas is delivered by way of manifolds or pans sealed to the respective faces of the fuel cell stack. The manifolds thus provide sealed passages for delivering fuel and oxidant gases to the fuel cells and directing the flow of such gases in the stack, thereby preventing those gases from leaking either to the environment or to the other manifolds. The manifolds must perform this function under the conditions required for operation of the fuel cell and for the duration of its life.

An important aspect of the performance of a fuel cell stack manifold is the gas seal established between the manifold edge and the stack face. As the stack face is typically electrically conductive and has an electrical potential gradient along its length and the manifold is typically constructed from metal, a dielectric insulator is needed to isolate the manifolds from the fuel cell stack and prevent the manifolds from shorting the stack. The dielectric insulator is typically constructed from ceramic, which tends to be brittle; therefore, manifold compression against the stack face or other mechanical changes in the manifolds due to thermal or mechanical stresses on the manifold system during operation of the fuel cell stack may damage the dielectric insulators.

Another requirement of fuel cell stack manifolds relates to the fact that typically a fuel cell stack will shrink over its life as the cell components creep and densify at high temperature. For a tall fuel cell stack (of approximately 300 fuel cells or more) the total height may decrease by 2–3 inches. This means that continuous metal manifolds cannot be fixed to both the top and bottom of the stack but rather must be able to accommodate such changes in stack dimensions during operation. Therefore, the manifold system employed to direct gas flows in the fuel cell stack must be flexible enough to move with the stack but must also maintain the gas seal. In addition, as discussed above, the stresses on the manifold system during operation of the stack must be at least partially absorbed so that the ceramic dielectric insulators are not caused to break.

Due to manufacturing defects before operation and due to its inherently non-uniform temperature distribution during operation, a tall fuel cell stack tends to bow. Horizontal deflection of the top of the stack at high temperatures can be as much as 1–2 inches relative to the base of the stack. This places a further burden on the manifolds, which are required to flex with the bowing stack in order to maintain tight gas seals.

Fuel cells operate at temperatures above ambient (Polymer Electrolyte Fuel cells, "PEFC": operate at about 80° C.; Phosphoric Acid Fuel cells, "PAFC": operate at about 200° C.; Molten Carbonate Fuel cells, "MCFC": operate at about 650° C.; Solid Oxide Fuel cells, "SOFC": operate at about 1000° C.). Therefore, the selection of materials and the mechanical design must allow the components to last for the life of the fuel cell stack (typically years). Component stress and corrosion must be considered relative to the environment in which these components must perform. In the case of MCFC and SOFC the temperatures are high enough and the lifetime long enough that long term creep of metallic components must be considered in their design.

Figure 1A:
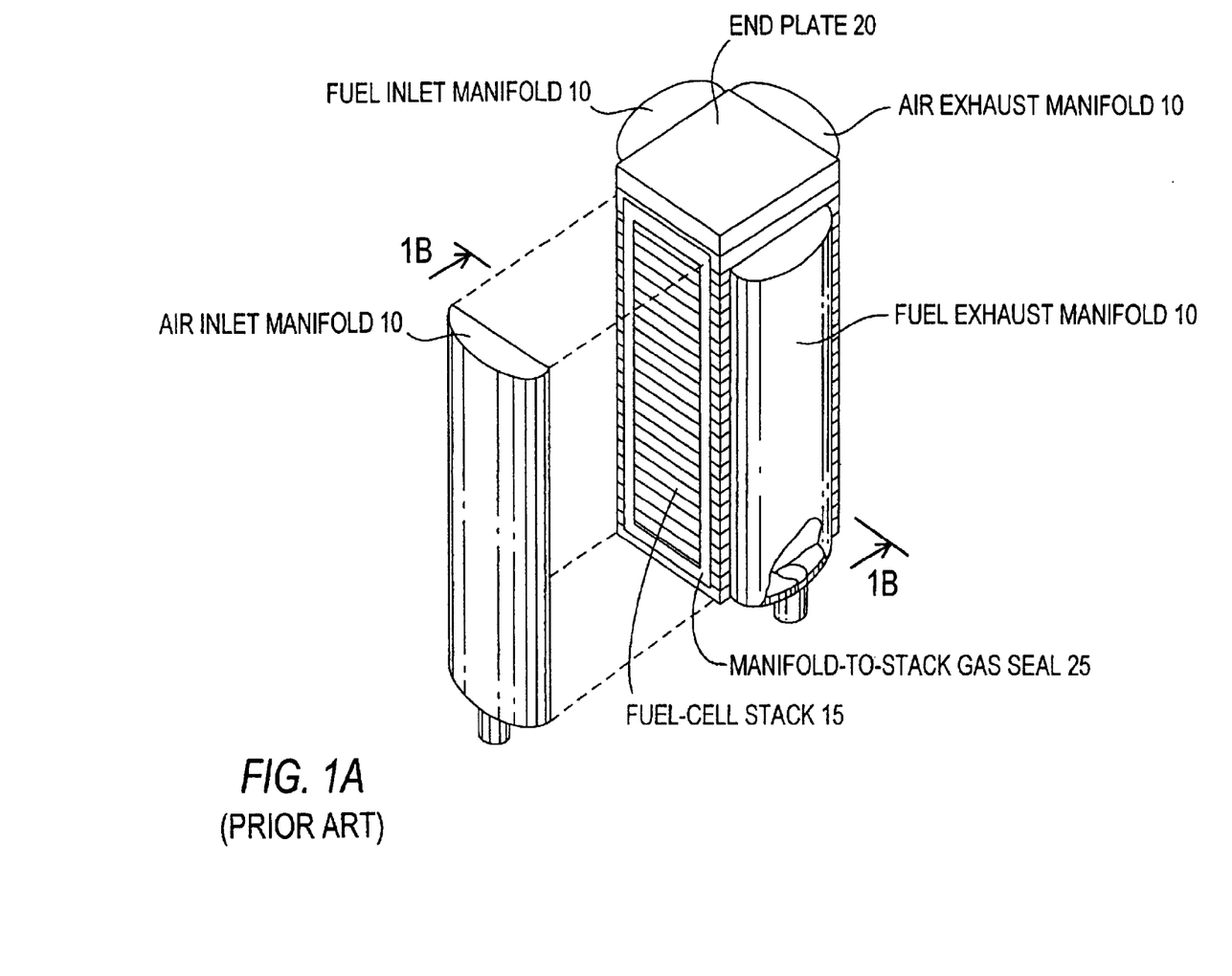
FIG. 1A is a perspective view of an externally manifolded fuel cell stack of the prior art.

The fuel cell manifold system currently used by the assignee of the subject application for tall carbonate fuel cell stacks is of a type as generally shown in FIG. 1A and includes solid rails positioned along the length of the stack and a manifold body comprising a pan. Dielectric insulators are typically fixed to the manifold by woodruff keys. This manifold system is somewhat more effective on short stacks (approximately 40 fuel cells or less) due to proportionately less bowing and deflection of the stack. The components used in this type of manifold system are constructed from high-temperature, corrosion-resistant materials such as nickel-based alloys and stainless steels.

The aforesaid manifold system also operates in conjunction with a retention system having a large quantity of different parts to satisfy the requirements for a uniformly distributed normal load application to the manifold that maintains the manifold in sealing relationship to the stack as well as allows both stack shrinkage and stack bowing. The selected materials, intricacy of the geometry and large number of parts used in this design make it expensive, heavy and difficult to install. Also, the retention system currently used by the assignee of this application in conjunction with the manifold system is designed to function completely independently from the manifolds and thus results in certain redundancies of material that add to the cost, weight and complexity of the fuel cell stack.

It is therefore an object of the present invention to provide a fuel cell stack manifold system that does not suffer from the above disadvantages.

It is a further object of the present invention to provide a fuel cell stack manifold system which is less costly, less complex and easier to manufacture.

It also an object of the present invention to provide a fuel cell stack manifold system that is flexible to accommodate stack bowing and shrinkage while maintaining a gas seal.

It is another object of the present invention to provide a fuel cell stack manifold system that includes a dielectric fixture arrangement that reduces or eliminates dielectric insulator breakage.

It is yet another object of the present invention to provide a fuel cell stack manifold system which requires few components and results in more effective gas sealing.

SUMMARY OF THE INVENTION

In accordance with the principles of the present invention, the above and other objectives are realized in a fuel cell stack manifold system which includes a manifold body in the form of a pan with a central area having at least one central area fold that connects adjacent sections of the central area. The pan also has extending from and about the periphery of the central area a sidewall with sidewall folds therein. The manifold system may also include a rail assembly, to which dielectric insulators may be attached, for joining the manifold body to a fuel cell stack face.

Each central area fold and the sidewall folds allow the manifold body to maintain a sealed relationship with the fuel cell stack face while flexing to accommodate changes in the fuel cell stack geometry during operation. The present manifold system thereby accommodates fuel cell stack shrinkage and bowing caused by temperature changes and material creep while maintaining the gas seal with the fuel cell stack face and absorbing mechanical and thermal strains.

In the embodiment of the invention to be disclosed further below, there is a plurality of central area folds spaced along the length of the central area. Each central area fold extends from the plane of the central area in a first sense and is bordered on opposite sides by corresponding sidewall folds which extend from the plane of the sidewall in a second sense opposite to the first sense to thereby form a compound fold. The sidewall folds are included in a first portion of the sidewall which extends outward from the central area in a first direction. The sidewall also includes a second portion extending from the first portion in a second direction. This second portion defines an end face and is provided with slots bordering the sidewall folds to accommodate these folds.

In the disclosed embodiment, the manifold system further includes a rail assembly. The rail assembly is attached around the periphery of the manifold body including at the end face defined by the second portion of the sidewall. The rail assembly is partially cut through its thickness to provide a kerf at positions adjacent the compound folds. The rail assembly is also adapted to carry pins for attaching the rail assembly to dielectric insulators used to electrically isolate the rail assembly and manifold from the fuel cell stack.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

As shown in FIG. 1A, in an external manifold system of the prior art, four like manifolds 10 are attached to a fuel cell stack 15 in facing relationship to the sides or end faces of the stack situated between the upper and lower end plates 20 of the stack. In the externally-manifolded fuel cell stack 15 shown, each one-piece manifold 10 functions as an inlet or exhaust for the flow of air or fuel through the fuel cells of the stack. Each manifold 10 is sealed to the stack 15 along its edges by a gas seal 25 formed by manifold rails and dielectric insulators attached thereto in order to maintain the direction of air and fuel gas flow and keep the gases separated as well as to electrically isolate the manifold from the stack.

In order for the manifolds 10 to maintain the gas seal 25, they must be flexible enough to accommodate physical changes in the stack 15 including shrinkage and bowing due to material creep and thermal expansion or contraction during stack operation. The flexibility of a one-piece manifold 10 is generally limited to the flexibility of the materials from which the manifold and rail are made. As manifold pans and rails are typically made from steel or other rigid material, stack bowing and shrinkage during operation usually exerts a degree of pressure on a manifold system that exceeds its flexibility such that the gas seal 25 between the manifold 10 and stack 15 may be broken or the manifold may tear.

Figure 1B:
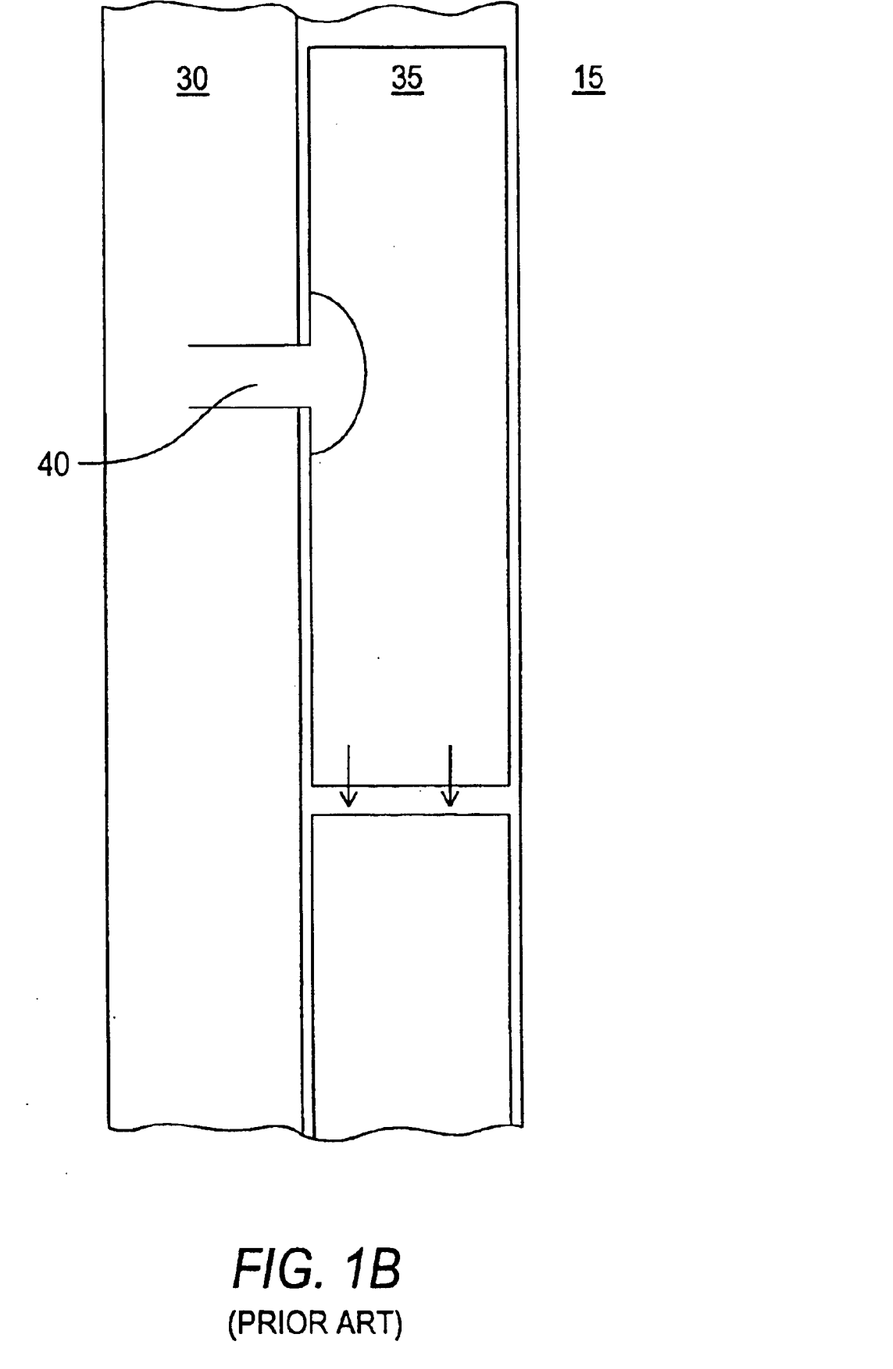
FIG. 1B is a detailed cross sectional view along line 1B—1B of FIG. 1A, showing the joint between the dielectric insulators and manifold body in the externally manifolded fuel cell stack of the prior art shown in FIG. 1A.

As shown in FIG. 1B, between each manifold rail member 30 and its respective stack face are dielectric insulators 35 that electrically isolate the manifold 10 (not shown in FIG. 1B) from the stack 15. The dielectric insulators 35 are joined to the manifold rail members 30 by woodruff keys 40. The insulators 35 are made of brittle ceramic material such as alumina. In order to maintain the integrity of the gas seal 25 between the manifolds 10 and the stack faces it is therefore important to protect the dielectric insulators 35 from failure. As a result of thermal and mechanical stresses that arise during operation of the fuel cell stack, the manifold 10 is compressed, exerting pressure on dielectric insulators 35. Due to the brittle nature of the insulators held in place by the woodruff keys 40, the insulators are unable to flex along the side of the stack 15 in response to flexing of the manifold 10 and therefore easily crack.

As shown in FIGS. 2A–2B and 5A–5C, the manifold system of the present invention comprises a manifold body 45 in the form of a pan having a rectangular central area 52 whose periphery is defined by first and second opposing sides 52A and 52B and third and fourth opposing sides 52C and 52D. A sidewall 54 of the pan extends outward from the periphery of the central area 52. The central area 52 has at least one central area fold and, in the case shown, a plurality of central area folds, shown as folds 62, connecting adjacent sections of the central area 52. Each central area fold 62 is bordered at its opposite lateral ends or sides by sidewall folds 64, each of which connects adjacent sections of the sidewall 54.

Figure 2A:
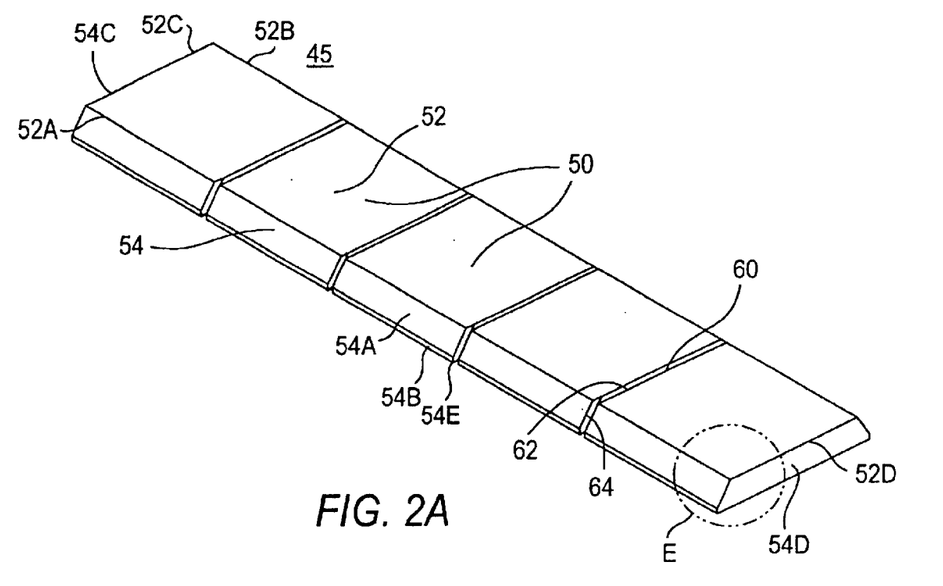
FIG. 2A is a perspective view of the manifold body of a manifold system in accordance with the principles of the present invention.
Figure 2B:
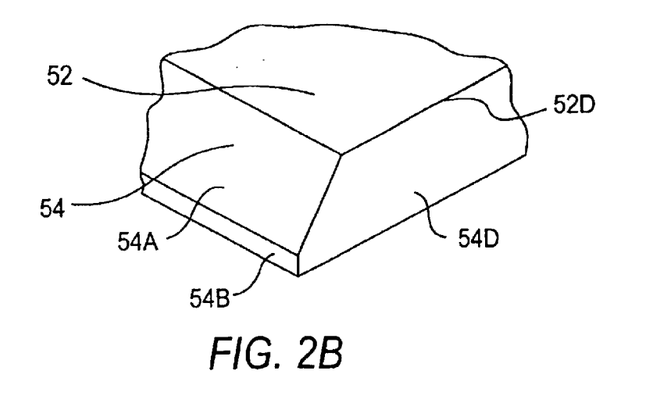
FIG. 2B is a detailed view of a portion of the manifold body of FIG. 2A encircled as "E" in FIG. 2A.
Figure 5A:
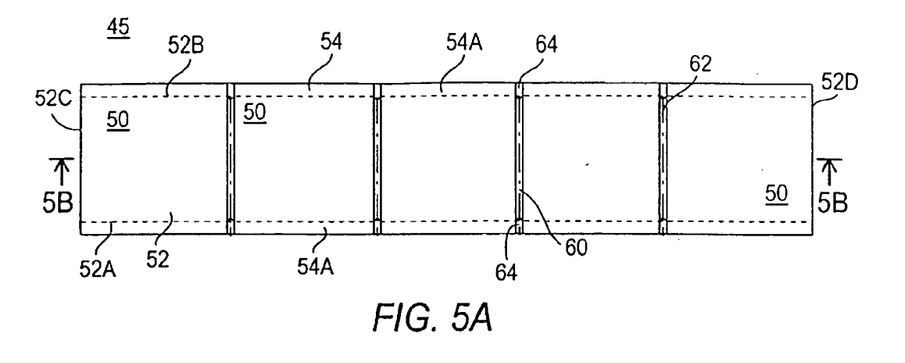
FIG. 5A is a top view of the manifold body of FIG. 2A, showing the compound folds therein.

In the case shown, each central area fold 62 extends from the plane of the central area in a first sense (shown as outward), while each sidewall fold 64 extends in a second sense (shown as inward) opposite the first sense from the plane of the sidewall. Accordingly, each central area fold 62 and its adjacent sidewall folds 64 together define a compound fold 60, which connects adjacent pan sections 50 of the manifold body 45.

The sidewall 54 adjacent each of the sides 52A and 52B of the central area 52 has a first sidewall portion 54A followed by a second sidewall portion 54B. The sidewall portion 54A extends outwardly from central area 52 in a first direction and the second sidewall portion extends from the first portion in a second direction. As shown, the first portion 54A is slanted relative to the central area 52. The second portion, in turn, is in a direction perpendicular to the plane of the central area and defines and end face for the manifold body 45.

Adjacent the sides 52C and 52D of the central area 52, the sidewall 54 has respective sidewall portions 54C and 54D. Each of these portions also extends in a direction perpendicular to the central area and like the sidewall sections 54B define end faces for the manifold assembly 45. The relative geometry of sidewall 54 including end face 54B, end face 54D and central area 52 of a pan section 50 is shown in more detail in FIG. 2B.

As above-stated, adjacent pan sections 50 of the manifold body 45 are connected by a compound fold 60 that is formed by a central area fold 62 in the central area 52 and adjacent sidewall folds 64 formed in the sidewall 54. As shown, each sidewall fold 64 is formed in the sidewall portion 54A, while the sidewall portion 54B adjacent each fold 64 is slotted at 54E to accommodate the fold.

With the above configuration for the manifold 45, the manifold is placed with the edges of the sidewall 54 adjacent the stack face. The presence of the compound folds 60 in the manifold 45, in turn, permit the manifold to expand and contract to accommodate for expansion and contraction of the stack. An overall simplified and better performing manifold assembly thereby results.

Figure 3A:
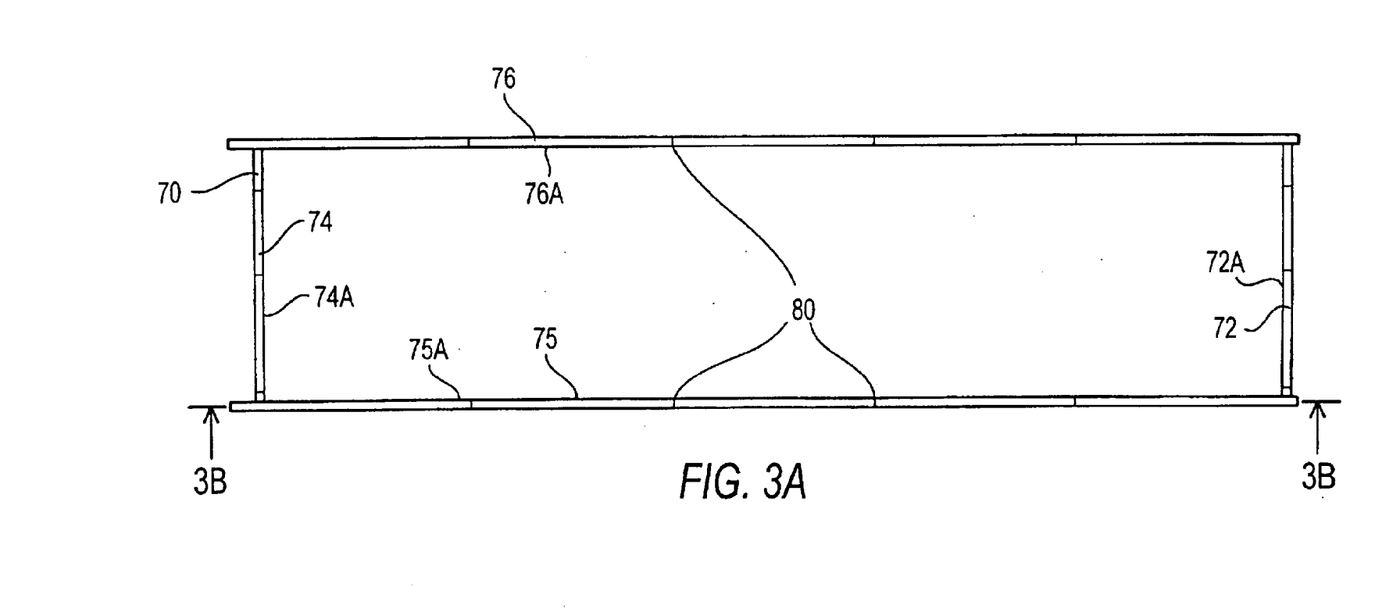
FIG. 3A is a top plan view of a rail assembly of a manifold system in accordance with the principles of the present invention.
Figure 3B:
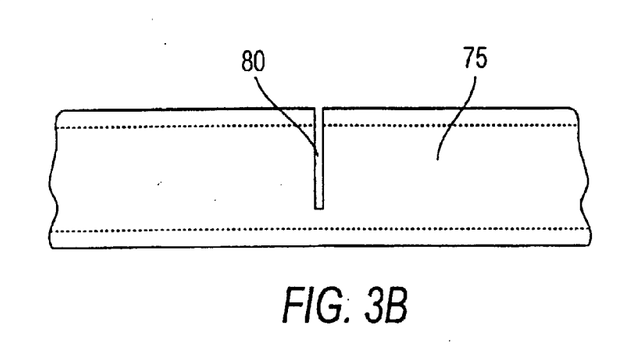
FIG. 3B is a cross-sectional view of the rail assembly of FIG. 3A taken along the line 3B—3B of FIG. 3A.
Figure 3C:
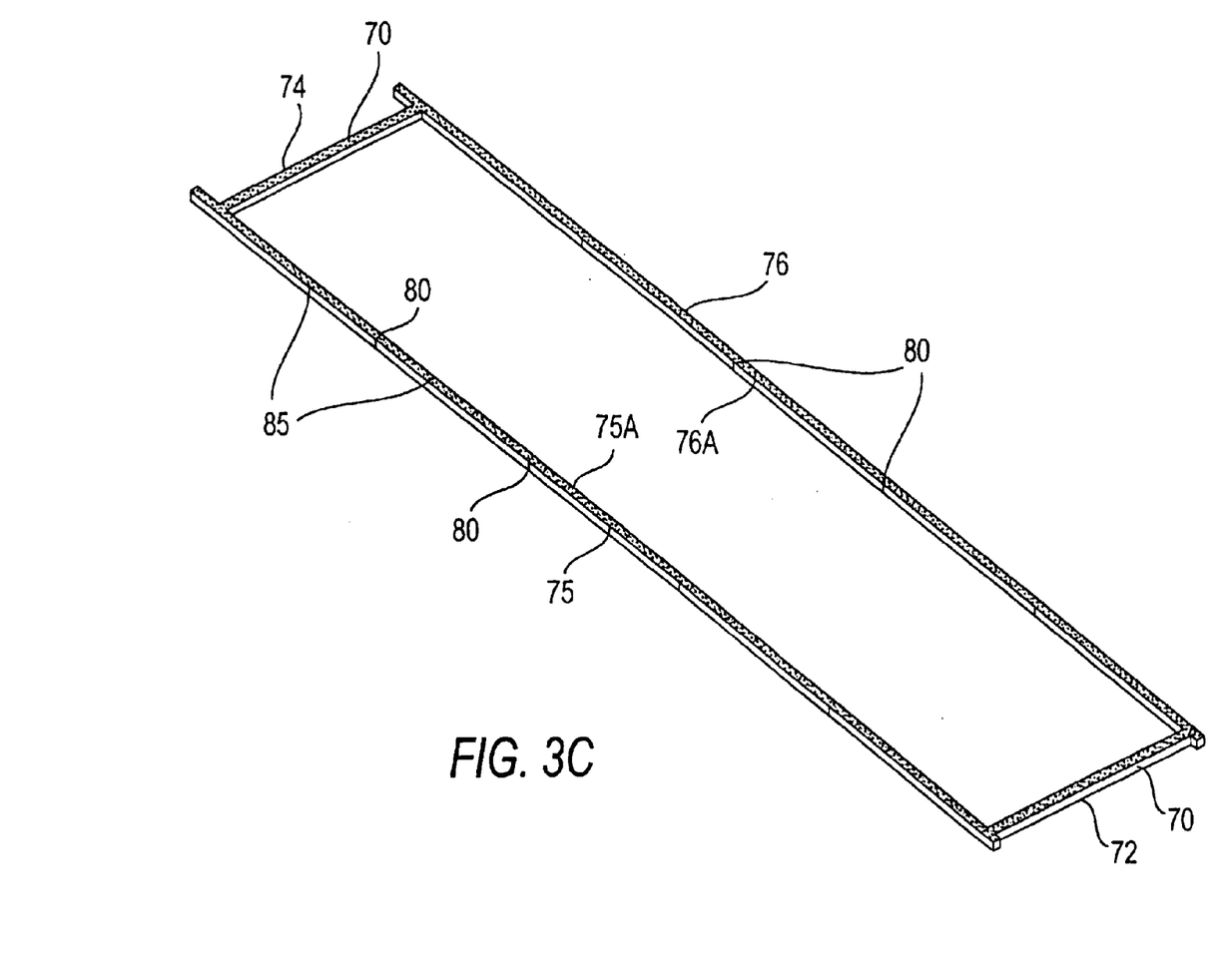
FIG. 3C is a perspective view of the rail assembly shown in FIG. 3A with dielectric insulators attached to the rail assembly.

In further accord with the invention, the manifold assembly 45 is utilized with a rail assembly 70 shown in FIGS. 3A–3C. The rail assembly 70 helps the manifold 45 to provide a gas-sealing interface with the respective stack face and to maintain such seal under the various operating conditions of the stack.

Looking at FIGS. 3A–3C, the rail assembly 70 includes opposing rail members 72, 74 whose inner surfaces 72A and 74A are adapted to be attached to the end faces 54C and 54D of the manifold 45 and third and fourth opposing rail members 75 and 76 whose inner surfaces 75A and 76A are adapted to be attached to the end faces 54B of the manifold 45. More particularly, rail members 72, 74 are arranged to be lined up with the opposing sides of a face of the fuel cell stack adjacent the end plates of the stack and the rail members 75 and 76, in turn, are arranged to be lined up with the other two opposing sides of the fuel cell stack face. This places the manifold assembly 45 in facing relationship with the stack face and the edges of the end faces 54B, 54C and 54D in abutting relationship with the sides of the stack face.

As shown, both rail members 75 and 76 extend beyond the end of the rail member 74 (see, FIGS. 3A and 3C). Each extended portion of rail members 75 and 76 supports a gasket (not shown) that moves with and accommodates shrinkage of the stack so that dielectric members can remain fixed to the rail.

Figure 4A:
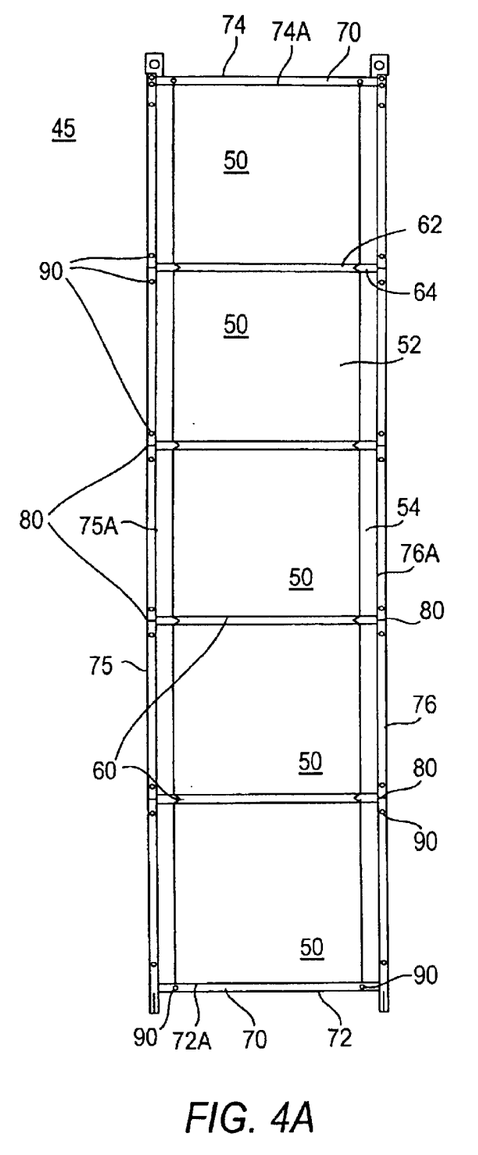
FIG. 4A is top plan view of the manifold system in accordance with the principles of the present invention, with the manifold body of FIG. 2A and rail assembly of FIG. 3A.

Each of the rail members 75 and 76 also has kerfs or partial cutouts 80 cut through a portion of its thickness at positions corresponding to the compound folds 60 and cutouts 54E in the manifold body 45 (see, FIG. 4A). As shown in FIG. 3B, each kerf 80 is cut into the rail 75 through a considerable potion of the rail thickness (shown as approximately ¾ of the thickness). The positioning of the cuts 80 in the rail members 75 and 76 in line with the compound folds 60 in the manifold body 45 allows the rail members to flex with the manifold body to accommodate the changes in the stack dimensions. The kerfs 80 thereby lend flexibility to the rail members which, combined with the flexibility of the manifold body imparted by the compound folds therein, enhances the integrity of the gas seal with the stack face under the thermal and mechanical stresses imposed on the manifold system during operation of the fuel cell stack.

Figure 4B:
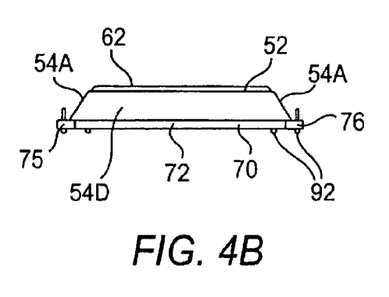
FIG. 4B is a front view of the manifold system of FIG. 4A.

FIGS. 4A–4B illustrate the rail assembly 70 and the manifold body 45 in attached relationship. As above-indicated, the manifold body is attached to the inner surfaces 72A, 74A, 75A and 76A of the rail members 72, 74, 75 and 76. The rail assembly 70 thus acts as a frame for the manifold assembly 45 with the manifold assembly resting within the rail assembly. This is apparent from FIG. 4B, in which the end face 54D, sidewall portions 54A, central area 52 and central area fold 62 of the manifold body 45 are visible. In FIG. 4B, the end faces formed by the sidewall portion 54B of the manifold body 45, however, are obstructed from view by the rail members 75 and 76, against which the end faces 54B abut. Similarly, the lower portion of the end face 54D of the of the manifold body 45 rests flush against the rail member 72 adjacent thereto.

Returning now to FIG. 3C, individual dielectric insulators 85 (shown as shaded layer 85 in FIG. 3C) of approximately the same dimensions as the rail members are lined up along and preferably attached to a top surface of the rail members. The dielectric insulators attached to the rail members 75 and 76 have approximately the same length as the rail portion between cuts 80 in these rail members so that breaks between each insulator 85 are disposed adjacent to the kerf cuts 80. In such an arrangement, each of the dielectric insulators 85 can move with the corresponding segment of the vertical rail member 75 or 76 to which it is attached.

The dielectric insulators 85 used in the present invention can be conventional dielectrics made of alumina or similar dielectric ceramic material. In addition, the surface of such dielectrics is preferably finished to reduce wicking.

Looking at FIGS. 4A–4B, holes 90 are disposed in the rail members 72, 74, 75 and 76 for receiving pins 92 to secure the dielectric insulators 85 to the rail assembly. In the case of the rail members 75 and 76, the holes 90 are on both sides of each cut 80, and in the case of the rail members 72 and 74, the holes 90 are at the ends of the rail members.

The pins 92 are preferably made from stainless steel and are round or cylindrical in shape. When used in accordance with the invention, the pins protrude from the holes 90 in the rail members, as is visible in FIG. 4B. The dielectric insulators (not shown) have holes for receiving the pins 92 so that the insulators are seated against the frame members, as discussed above. The pins 92 create less stress on the insulators because they are able to more effectively distribute the stress and are thicker and stronger than woodruff keys used in the prior manifolds. However, it should be noted that the invention can be practiced with equivalent or alternative mechanisms for joining the dielectric insulators to the rail assembly.

Figure 5B:
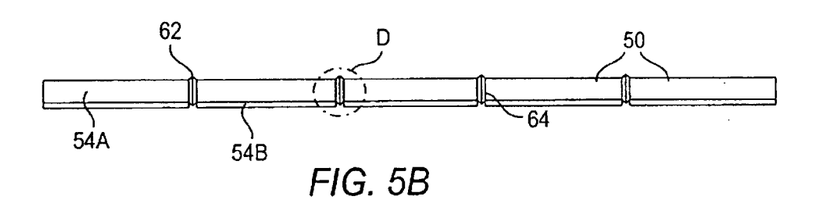
FIG. 5B is a cross-sectional view of the manifold body taken along line 5B—5B of FIG. 5A.
Figure 5C:
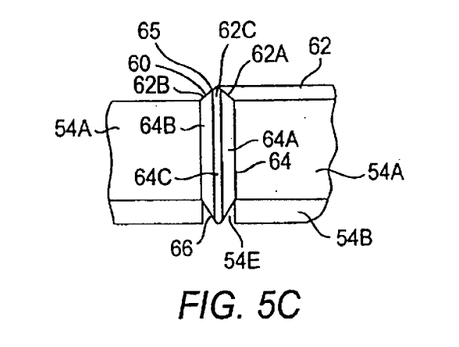
FIG. 5C is a detailed view of the portion of the manifold body encircled as D in FIG. 5B.

FIGS. 5A–5C illustrate in greater detail the compound folds 60 in the pan sections 50 in the manifold body 45 of the invention. The compound folds 60 in the present illustrative case are each of the same configuration, so that a detailed description of one fold will be applicable to all the folds.

As previously described, each compound fold 60 comprises a central area fold 62 and adjacent sidewall folds 64. As can be appreciated and as discussed above, each sidewall fold 64 extends only in the sidewall section 54A, and is adjacent a cutout 54E in the sidewall section 54B. Each sidewall fold 64 may, therefore, freely extend inwardly between adjacent sidewall portions 54A without interfering with the sidewall portions 54B forming the end faces of the manifold body. However, in order to maintain the seal between the manifold body 45 and the rail members 75 and 76 of the rail assembly, against which the sidewall portions 54B rest, the sidewall fold 64 is formed such that its outermost edge is in the same plane as the sidewall portions 54B. This is more clearly shown in the detailed view of the sidewall fold shown in FIG. 5C.

Turning to FIG. 5C, the sidewall fold 64 of each compound fold 60 comprises adjacent portions of the sidewall portion 54A that extend from the plane of the sidewall in a first sense (shown as inward). More particularly, first and second opposing portions 64A and 64B of each sidewall fold 64 extend in inclined fashion toward each other relative to the plane of the sidewall portion 54A. The first and second portions 64A and 64B are connected by a rounded base portion 64C of the fold. The rounded base portion 64C adds durability to the sidewall fold 64 in that it is less prone to tear than a straight edge when the sidewall fold is repeatedly subject to thermal and mechanical stress as a result of stack changes during operation of the fuel cell.

Figure 7:
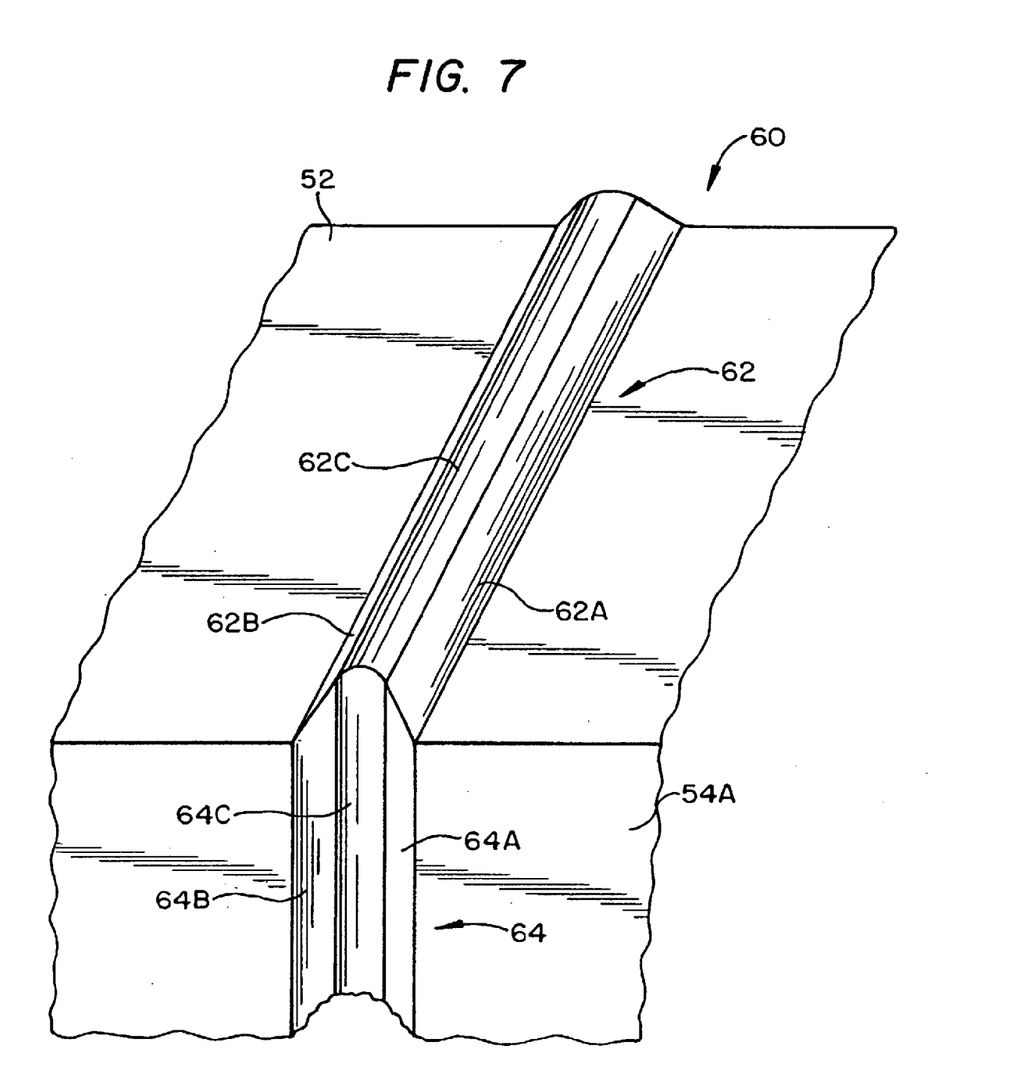
FIG. 7 is a further detailed view of the portion of the manifold body shown in FIG. 5C.

The central area fold 62 of each compound fold 60 comprises adjacent portions of the central area 52 that extend in a second sense (shown as outward) relative to the plane of the central area 52. More particularly, the central area fold 62 is similar in configuration to the sidewall fold 64 in that it comprises first and second opposing portions 62A and 62B which extend in inclined fashion toward each other relative to the plane of the central area 52. A round peak portion 62C of the fold 62 connects the inclined sections. Like the rounded base portion 64C of sidewall folds 64, the rounded peak portion 62C adds durability and strength to the fold. The features of the central area fold 62 and sidewall fold 64 can be seen in even greater detail in FIG. 7, which is a further detailed view of the portion of the manifold body, particularly the compound fold, as shown in FIG. 5C.

In the present illustrative embodiment, as above-stated, the central area fold 62 extends from the plane of the central area 52 in a sense opposite to the sense in which the sidewall folds 64 extend outwardly relative to the plane of the sidewalls 54. However, it is within the contemplation of the invention that the sidewall folds 64 and the central area folds 62 can extend in the same sense, i.e., can both extend inward or both outward, or can be of the opposite sense than shown, i.e., the folds 62 can be inward and the folds 64 can be outward. It is also within the contemplation of the invention that the folds 64 need not each extend in the same sense, i.e., some can extend inward and some can extend outward, and also that each of the folds 62 need not extend in the same sense, i.e., some can extend inward and some outward.

As shown in FIG. 5A, the central area fold 62 of each compound fold 60 extends between first and second opposing sides of the central area 52 and is bordered on such first and second opposing sides of the central area 52 by sidewall folds 64. While the outer edge 66 of each sidewall fold 64 is in the same plane as the end faces 54B of the sidewall 54, as discussed above with reference to FIG. 5C, the inner edge 65 of each sidewall fold 64, shown in FIG. 5C, defines an outer edge of the central area fold 62.

When the manifold body 45 is under compression, for example, during either bowing or shrinkage of the fuel cell stack, the compound fold 60 absorbs compressive stresses by flexing such that the angle of both the central area fold 62 and the sidewall fold 64 of each compound fold 60 generally decreases. When the manifold body 45 is expanded and pan sections 50 are pulled away from each other, as may occur in the event of stack bowing, the angle of the fold in both the central area fold and the sidewall fold 62, 64 generally increases.

The rounded peak portions 62C and rounded base portions 64C serve to impart durability to the central area folds and sidewall folds 62, 64 respectively, which cooperate to add flexibility to the manifold body 45. In addition, by extending outwardly relative to the fuel cell stack in the central area 52 of the manifold body 45 and inwardly relative to the fuel cell stack at its sidewalls 54, the compound fold 60 allows the manifold body 45 to be attached to the rail assembly 70, while accommodating the flexibility of the rail imparted by cuts 80 formed therein.

Figure 6A:
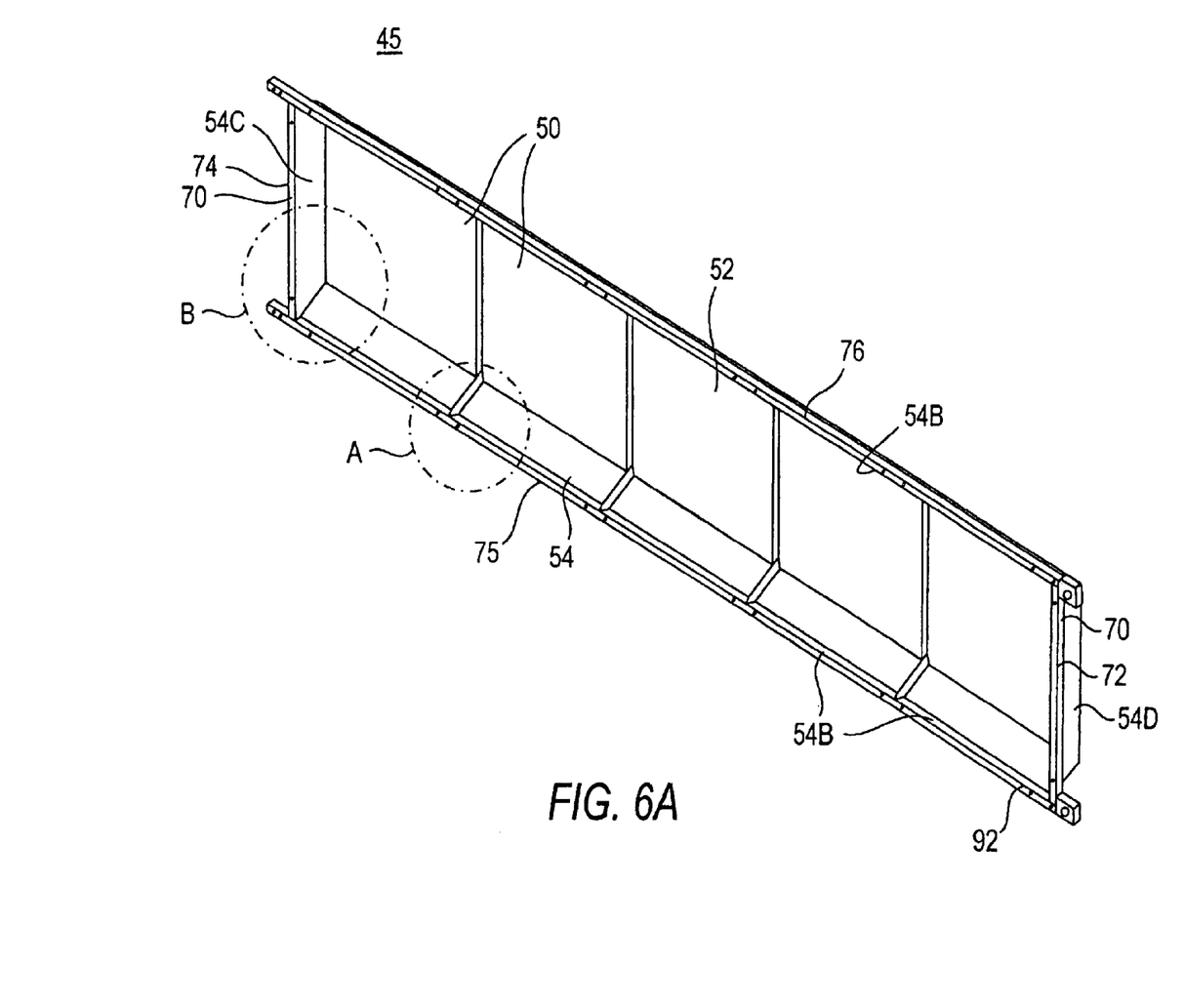
FIG. 6A is a perspective view of the underside of the manifold system of FIG. 4A.

As previously discussed, the manifold body 45 is positioned within the rail assembly 70 of the manifold system, as shown in FIG. 6A. End faces 54C and 54D of the sidewall 54 are positioned facing the horizontal rails 72 and 74, and the end faces 54B of the sidewall 54 are positioned facing the vertical rails 75 and 76. Dielectric insulators may be attached to the underside of the manifold rails by pins 92.

Figure 6B:
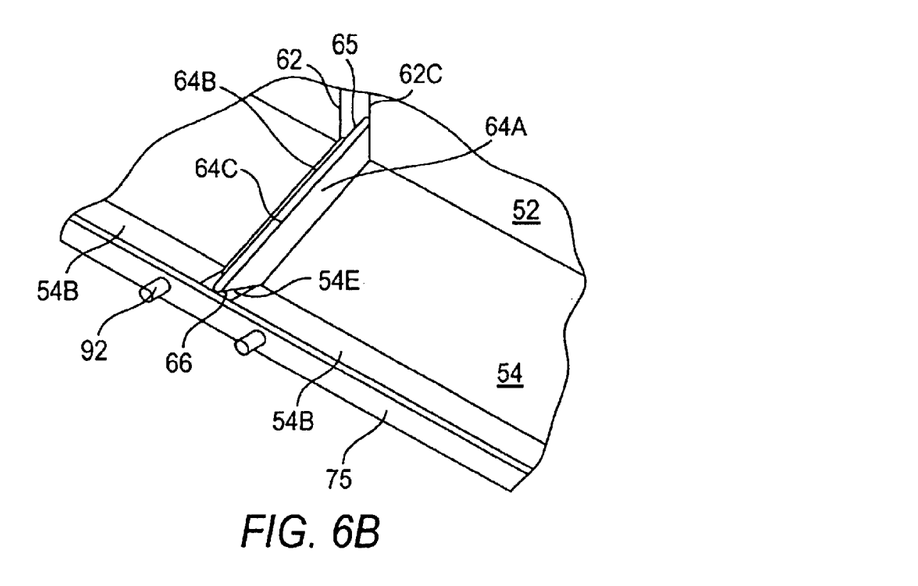
FIG. 6B is a detailed view of the encircled portion A of the manifold system shown in FIG. 6A.
Figure 6C:
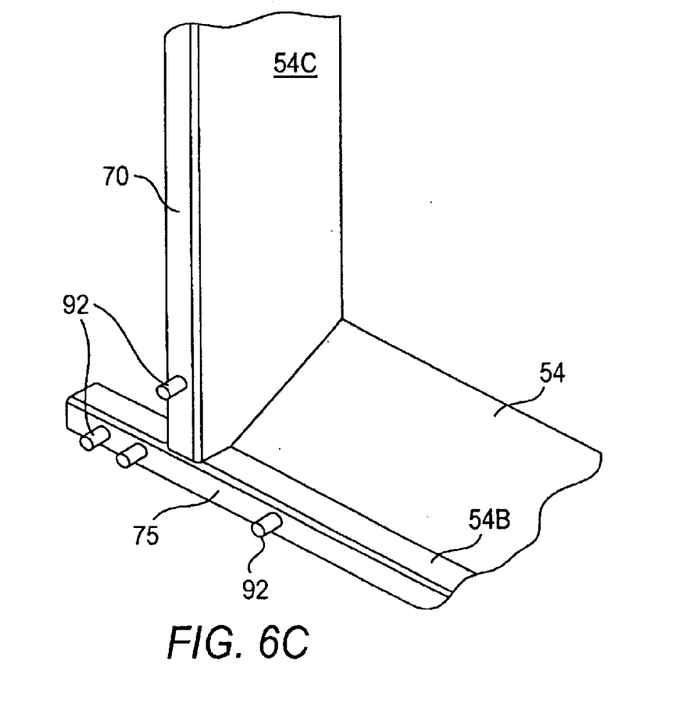
FIG. 6C is a detailed view of the encircled portion B of the manifold system shown in FIG. 6A.

A detailed view of the underside of the manifold system, including the compound fold 60, end faces 54B of the sidewall fold 64, and vertical rail 75 with pins 92, is shown in FIG. 6B. Central area fold 62 is bordered by a sidewall fold 64 such that the outer edge 65 of the central area fold defines the edge of the sidewall fold 64 and the rounded peak portion 62C of the central area fold 62 intersects the rounded base portion 64C of the sidewall fold 64. The sidewall fold 64 connects adjacent portions of the sidewall 54 and extends from the edge 65 of the central area fold 62 to its outer edge 66. The rounded base 64C of the sidewall fold terminates in the slot 54E between end faces 54B of the sidewall so that the outer edge 66 of the sidewall fold is in the same plane as end faces 54B of the sidewall.

In a present illustrative embodiment, the end faces 54B, 54C and 54D of the sidewall 54 are welded to the respective inner surfaces 75A, 76A, 72A and 74A of the rails 75, 76, 72 and 74. It should be noted, however, that other means of attaching the rail members to the end faces of the manifold body 45 may be used consistently with the manifold assembly of the present invention.

As previously mentioned, each cut 80 in the vertical rails 75 and 76 lies approximately in line with a sidewall fold 64 and, in particular, with the rounded base portion 64C of the fold. As also previously discussed, dielectric insulators are attached to the horizontal and vertical rails 72, 74, 75 and 76 of the rail assembly by pins 92. By the positioning of these rectangular dielectric insulator segments such that their ends are approximately lined up with the cuts 80 in rails 75 and 76 and with the compound folds 60 in the manifold body 45, maximum flexibility of the manifold assembly and minimal breakage of the dielectrics is achieved.

It should be noted that the principles of the invention apply equally as well to stacks having all or some of their manifolds adjacent respective stack faces. Moreover, the principles of the invention are intended to apply to stacks having any number of faces and manifolds.

In all cases it is understood that the above-described arrangements are merely illustrative of the many possible specific embodiments that represent applications of the present invention. Numerous and varied other arrangements can be readily devised in accordance with the principles of the present invention without departing from the spirit and scope of the invention. For example, the manifold system described herein may be attached to and compressed against a fuel cell stack by truss and strap members that are part of a retention system as described in detail in the above-mentioned U.S. application Ser. No. 09/636,452.

What is claimed is:

1. A manifold system for use in coupling gases to or from the face of a fuel cell stack, the manifold system comprising:
a manifold body in the form of a pan, the pan having a central area having length and width extent and a sidewall extending from the periphery of said central area, the central area having at least one central area fold, each central area fold connecting adjacent sections of the central area which define pan sections of the manifold body.

2. A manifold system in accordance with claim 1, wherein each of said central area folds extends in one of a first sense and second sense relative to the plane of said central area.

3. A manifold system in accordance with claim 2, wherein said sidewall includes one or more sidewall folds, each sidewall fold bordering an end of a central area fold and connecting adjacent sections of the sidewall.

4. A manifold system in accordance with claim 3, wherein each sidewall fold extends in one of said first sense and said second sense relative to the plane of said sidewall.

5. A manifold system in accordance with claim 4, wherein each central area fold extends in said first sense and each sidewall fold extends in said second sense.

6. A manifold system in accordance with claim 5, wherein said first sense is outward and said second sense is inward.

7. A manifold system in accordance with claim 6, wherein said sidewall has a first portion which extends outward in a first direction relative to said central area and a second portion which extends from the first portion in a second direction relative to said central area.

8. A manifold system in accordance with claim 7, wherein the sidewall folds are in said first portion of said sidewall.

9. A manifold system in accordance with claim 8, wherein said sidewall has slots each located in said second portion of said sidewall at a position bordering a sidewall fold.

10. A manifold system in accordance with claim 9, wherein an edge of each of said sidewall folds extends to the slot bordering that sidewall fold and is in the plane of the second portion of said sidewall.

11. A manifold system in accordance with claim 4, wherein the periphery of said central area has first and second opposing sides and third and fourth opposing sides, said third side being connected to first opposing ends of said first and second opposing sides and said fourth side being connected to second opposing ends of said first and second sides, said sidewall having first, second, third and fourth connected sidewall parts extending, respectively, from said first, second, third and fourth sides of said central area, each said central area fold extending between said first and second sides of said central area, the first sidewall part having a sidewall fold bordering each central area fold which ends at said first side of said central area, and the second sidewall part having a sidewall fold bordering each central area fold which ends at said second side of said central area.

12. A manifold system in accordance with claim 11, wherein each central area fold extends in said first sense and each sidewall fold extends in said second sense.

13. A manifold system in accordance with claim 12, wherein said first sense is outward and said second sense is inward.

14. A manifold system in accordance with claim 13, wherein each of said first and second sidewall parts has a first portion which extends outward in a first direction relative to said central area and a second portion which extends from the first portion in a second direction relative to said central area.

15. A manifold system in accordance with claim 14, wherein the sidewall folds are in said first portion of each of said first and second sidewall parts.

16. A manifold system in accordance with claim 15, where each of said first and second sidewall parts has slots each located in said second portion of the respective first and second sidewall part at a position bordering a sidewall fold.

17. A manifold system in accordance with claim 16, wherein an edge of each of said sidewall folds extends to the slot bordering that sidewall fold and is in the plane of the second portion of the respective first and said sidewall part.

18. A manifold system in accordance with claim 17, wherein a further edge of each of said sidewall folds extends to the central area fold bordering that sidewall fold to form a compound fold.

19. A manifold system in accordance with claim 18, wherein said central area has a plurality of said central area folds.

20. A manifold system in accordance with claim 19, wherein said central area folds are parallel, said first direction is at a slant to the plane of said central area, and said second direction and said third and fourth sidewall parts are perpendicular to the plane of said central area.

21. A manifold system in accordance with claim 20, wherein each sidewall fold has first and second opposing sidewall fold parts connected by a rounded base sidewall fold part.

22. A manifold system in accordance with claim 21, wherein each central area fold has first and second opposing central area fold parts connected by a rounded peak central area fold part.

23. A manifold system in accordance with claim 22, wherein the second portions of said first and second sidewall parts and the ends of said third and fourth sidewall parts form first, second, third and fourth end faces.

24. A manifold system in accordance with claim 23, further comprising:

a rail assembly for supporting said manifold body.

25. A manifold system in accordance with claim 24, wherein said rail assembly comprises first, second, third and fourth rail members, said third rail member being connected to first opposing ends of said first and second rail members and said fourth rail member being connected to second opposing ends of said first and second rail members, said first, second, third and fourth rail members having first, second, third and fourth inner faces connected to said first, second, third and fourth end faces, respectively, of said manifold body so that said manifold body rests within said frame assembly.

26. A manifold system in accordance with claim 25, wherein said first, second, third and fourth inner faces are welded to said first, second, third and fourth end faces.

27. A manifold system in accordance with claim 25, wherein said first and second rail members have cuts extending partially through the thickness of said rail members at positions of said rail members bordering a sidewall fold.

28. A manifold system in accordance with claim 27, wherein said rail assembly further includes pins attached to and extending from faces of said first, second, third and fourth rail members, which border the edges of said end faces of said manifold body.

29. A manifold system in accordance with claim 28, wherein said pins are located in said first and second rail members on opposite sides of each of said cuts.

30. A manifold system in accordance with claim 29, wherein said rail assembly further includes dielectric insulator strips each supported by a pair of successive pins such that each dielectric insulator strip extends between successive cuts in a rail member.

31. A manifold system in accordance with claim 30, wherein said pins are located in said third and fourth rail members at opposite ends of said third and fourth rail members, and said rail assembly further includes dielectric strips each supported by said pins on a respective one of said third and fourth rail members.

32. A manifold system in accordance with claim 14, wherein the second portions of said first and second sidewall parts and the ends of said third and fourth sidewall parts form first, second, third and fourth end faces.

33. A manifold system in accordance with claim 32, further comprising:

a rail assembly for supporting said manifold body.

34. A manifold system in accordance with claim 33, wherein said rail assembly comprises first, second, third and fourth rail members, said third rail member being connected to first opposing ends of said first and second rail members and said fourth rail member being connected to second opposing ends of said first and second rail members, said first, second, third and fourth rail members having first, second, third and fourth inner faces connected to said first, second, third and fourth end faces, respectively, of said manifold body so that said manifold body rests within said frame assembly.

35. A manifold system in accordance with claim 34, wherein said first and second rail members have cuts extending partially through the thickness of said rail members at positions of said rail members bordering a sidewall fold.

36. A manifold system in accordance with claim 35, wherein said rail assembly further includes pins attached to and extending from faces of said first, second, third and fourth rail members which border the edges of said end faces of said manifold body.

37. A manifold system in accordance with claim 36, wherein said pins are located in said first and second rail members on opposite sides of each of said cuts.

38. A manifold system in accordance with claim 37, wherein said rail assembly further includes dielectric insulator strips each supported by a pair of successive pins such that each dielectric insulator strip extends between successive cuts in a rail member.

39. A manifold system in accordance with claim 38, wherein said pins are located in said third and fourth rail members at opposite ends of said third and fourth rail members, and said rail assembly further includes dielectric strips each supported by the pins on a respective one of said third and fourth rail members.

40. A manifold system in accordance with claim 1, further comprising:

a rail assembly for supporting said manifold body.

41. A manifold system in accordance with claim 39, wherein said rail assembly is in the form of a frame and said manifold body is supported in said frame.

* * * * *

UNITED STATES PATENT AND TRADEMARK OFFICE
CERTIFICATE OF CORRECTION

PATENT NO. : 6,887,611 B2
DATED : May 3, 2005
INVENTOR(S) : Michael Cramer et al.

It is certified that error appears in the above-identified patent and that said Letters Patent is hereby corrected as shown below:

Column 1,
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Sixteenth Day of May, 2006

JON W. DUDAS
*Director of the United States Patent and Trademark Office*